(12) United States Patent
Tong

(10) Patent No.: US 9,926,032 B1
(45) Date of Patent: Mar. 27, 2018

(54) CONVERTIBLE TRICYCLE

(71) Applicant: Kun Yuan Tong, Suwanee, GA (US)

(72) Inventor: Kun Yuan Tong, Suwanee, GA (US)

( * ) Notice: Subject to any disclaimer, the term of this patent is extended or adjusted under 35 U.S.C. 154(b) by 0 days.

(21) Appl. No.: 15/372,117

(22) Filed: Dec. 7, 2016

(51) Int. Cl.
*B62K 13/02* (2006.01)
*B62K 13/04* (2006.01)
*B62K 27/10* (2006.01)
*B62K 19/32* (2006.01)
*B62K 21/24* (2006.01)
*B62K 5/02* (2013.01)

(52) U.S. Cl.
CPC ............. *B62K 13/025* (2013.01); *B62K 5/02* (2013.01); *B62K 13/04* (2013.01); *B62K 19/32* (2013.01); *B62K 21/24* (2013.01); *B62K 27/10* (2013.01)

(58) Field of Classification Search
CPC ........ B62K 5/02; B62K 13/02; B62K 13/025; B62K 13/04; B62K 19/32; B62K 21/24; B62K 27/10
USPC .................................................. 280/7.16, 239
See application file for complete search history.

(56) References Cited

U.S. PATENT DOCUMENTS

| | | | |
|---|---|---|---|
| 552,907 A | 1/1896 | Jakobson | |
| 579,982 A | 4/1897 | Jakobson | |
| 598,872 A | 2/1898 | Hunt | |
| 1,300,343 A | 4/1919 | Carswell | |
| 1,434,701 A * | 11/1922 | Hudry | B62K 13/04 280/261 |
| 2,271,255 A * | 1/1942 | Du Bois | B62K 5/01 280/489 |
| 4,458,908 A | 7/1984 | Strong | |
| 4,466,629 A * | 8/1984 | Sinyard | B62K 19/32 280/279 |
| 5,039,120 A * | 8/1991 | Stowe | B60D 1/00 280/204 |
| 5,372,371 A * | 12/1994 | Larson | B62K 13/025 280/239 |
| 5,716,065 A | 2/1998 | Liu | |
| 5,785,335 A * | 7/1998 | George | B62K 13/025 280/204 |
| 5,860,662 A | 1/1999 | Bartoshesky et al. | |
| 2003/0025295 A1* | 2/2003 | Snobl | B62K 13/02 280/292 |
| 2011/0187072 A1* | 8/2011 | Park | B60T 7/102 280/204 |

* cited by examiner

*Primary Examiner* — Frank B Vanaman
(74) *Attorney, Agent, or Firm* — Wang Law Firm, Inc.

(57) ABSTRACT

A convertible bicycle has separable front and rear wheel units. The convertible bicycle can operate in individual or in tandem mode as a tricycle unit. The rear wheel unit has a vertical interlocking gear which can interface with a frontal interlocking gear of the frontal wheel unit. The front wheel unit of an auxiliary bicycle can be detached and the remaining rear wheel unit attached to the rear wheel unit of another bicycle in order to form a tandem tricycle.

8 Claims, 4 Drawing Sheets

CONVERTIBLE TRICYCLE

FIELD OF INVENTION

The present invention relates to bicycle, more specifically to a bicycle that can be converted to different form.

BACKGROUND

The bicycle is a triumph of human engineering, one of the most energy-efficient motion machines ever produced by mankind. It combines simplicity of design and ease of manufacture with an adaptable architecture which can be customized in a myriad ways, yet the overriding configuration has changed relatively little since the advent of the first modern bicycles. Most conventional bicycles are designed for solitary use by a single individual and require some degree of practice before basic competence in use is achieved.

Conventional bicycles are suited for young people who are single. However, as a person matures and finds a mate, he or she may want to have more romantic rides with a partner without purchasing a second bicycle. It is to a bicycle that enables romantic rides for two people that the present invention is primarily directed.

SUMMARY OF THE INVENTION

The embodiments described herein relate to a convertible tricycle. A first embodiment provides a convertible bicycle designed to be easily disassembled into a front wheel unit and a rear wheel unit. Each wheel unit is equipped with a pair of corresponding interlocking gears, one at the front of the front wheel unit and one at the rear of the rear wheel unit. The front interlocking gear can insert into the rear interlocking gear. This allows the front interlocking gear of a free front wheel unit to couple with the rear interlocking gear of a convertible bicycle in order to form a tandem bicycle which accommodates two riders. The process can be repeated for additional riders, as many as desired.

Additional advantages and novel features will be set forth in part in the description to follow, and in part will become apparent to those skilled in the art upon examination of the following and the accompanying drawings or may be learned by production or operation of the disclosed embodiments. The advantages of the present embodiments may be realized and attained by practice or use of various combinations of the methods, instruments, and devices set forth in the detail description below.

BRIEF DESCRIPTION OF THE DRAWINGS

In the drawings and the detailed description, like numerals denote like parts. These exemplary embodiments are described in detail with reference to the drawings. Unless explicitly stated, it is not to be assumed that drawings are to scale.

DETAILED DESCRIPTION OF THE INVENTION

The present invention is directed towards a convertible bicycle which may be operated in individual mode or in tandem mode. The present specification discloses a tandem bicycle structure that can be assembled from two ordinary bicycles, wherein each bicycle can be disassembled into three units: a front wheel, a rear wheel, and a triangular bicycle frame. The bicycle structure of a second bicycle, after removing the front wheel, can be attached to a first bicycle placed in the front. The resulting tandem bicycle structure has a first bicycle frame with a triangular frame with a rear connecting beam. The rear connecting beam is pivotally connected to a rear female interlocking gear through a hinge. The second bicycle, with the front wheel detached, has a second triangular bicycle frame with a vertical frame tube and a vertical handle rod passing through the vertical frame tube of the second bicycle frame. The vertical handle rod connects to the rear female interlocking gear of the first bicycle frame. Because of the rear female interlocking gear is pivotally connected to the rear connecting beam, the second bicycle frame swings relative to the first bicycle frame and around the hinge. The present invention enables two ordinary bicycles to be easily converted to a tandem tricycle and also easily converted back to two independent bicycles.

Figure 1:
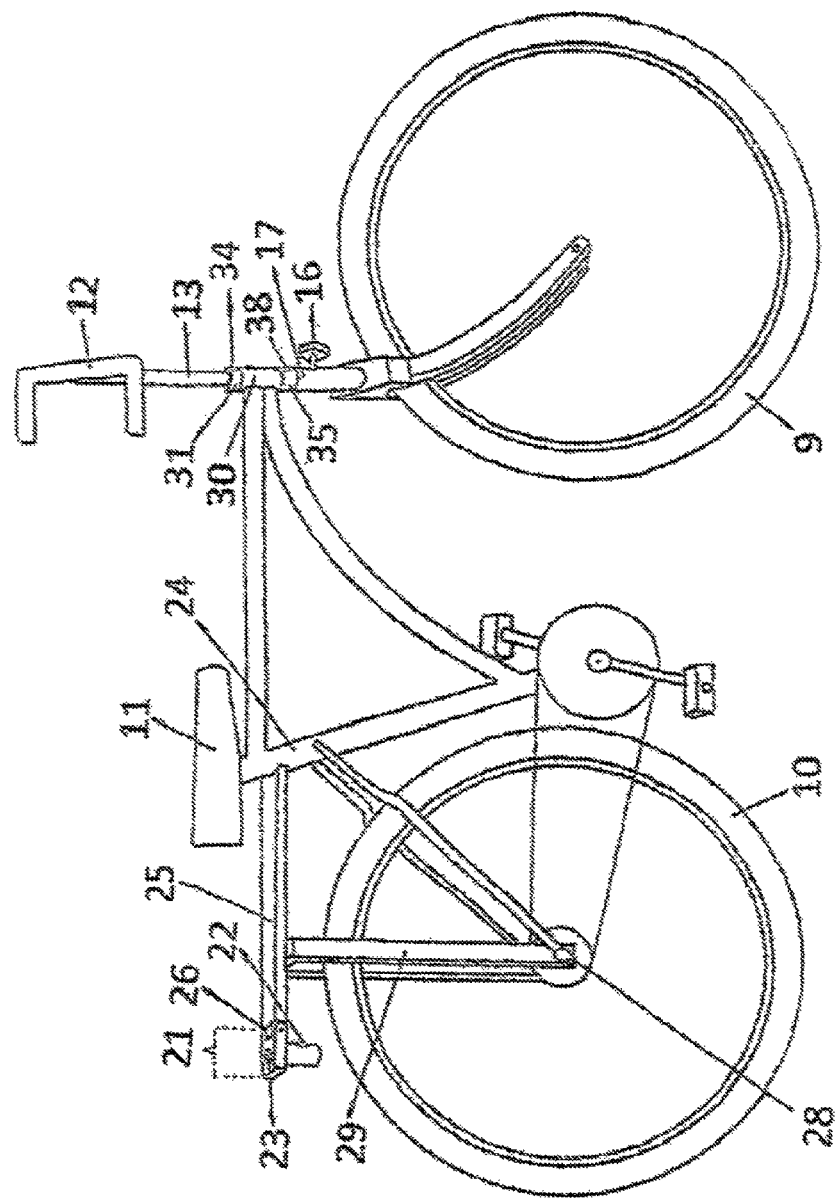
FIG. 1 illustrates a single unit of the convertible bicycle.

Referring now in detail to the drawings, FIG. 1 depicts an assembled convertible bicycle 4. The convertible bicycle 4 includes a front wheel 9, a rear wheel 10, and a triangular frame structure. The triangular frame structure has a seat 11, handlebar 12, and vertical handle rod 13 attached. The handlebar 12 rests atop the vertical handle rod 13. The front wheel 9 is connected to the vertical handle rod 13 by a frontal female interlocking gear 17. The vertical handle rod 13 passes through an upper connector ring 31 and a lower connector ring 35; between the upper connector ring 31 and the lower connector ring 35 lies a front vertical frame tube 30 through which the vertical handle rod 13 passes. A thumb screw 16 is disposed on the frontal female interlocking gear 17. The vertical handle rod 13 is locked to the upper ring 31 by an upper screw 34 and to the lower ring 35 by a lower screw 38. The upper connector ring 31 and the lower connector ring 35 together secure the vertical handle rod 13 to the front vertical frame tube 30; in this configuration, the vertical handle rod 13 is permitted to rotate but cannot be moved up or down relative to the front vertical frame tube 30.

The seat 11 is installed atop a rear vertical supporting tube 24. A rear connecting beam 25 is attached beneath the seat 11 to the rear vertical supporting tube 24. A rear wheel axle 28 connects the rear wheel 10 to the rear vertical supporting tube 24. The rear wheel axle 28 is further attached to the rear connecting beam 25 by a vertical supporting arch 29. The rear connecting beam 25 has a hinge 26 which is attached to a rear female interlocking gear 21. The rear female interlocking gear 21 includes the hinge 26, a screw hole 22, and a canal 23.

Figure 2:
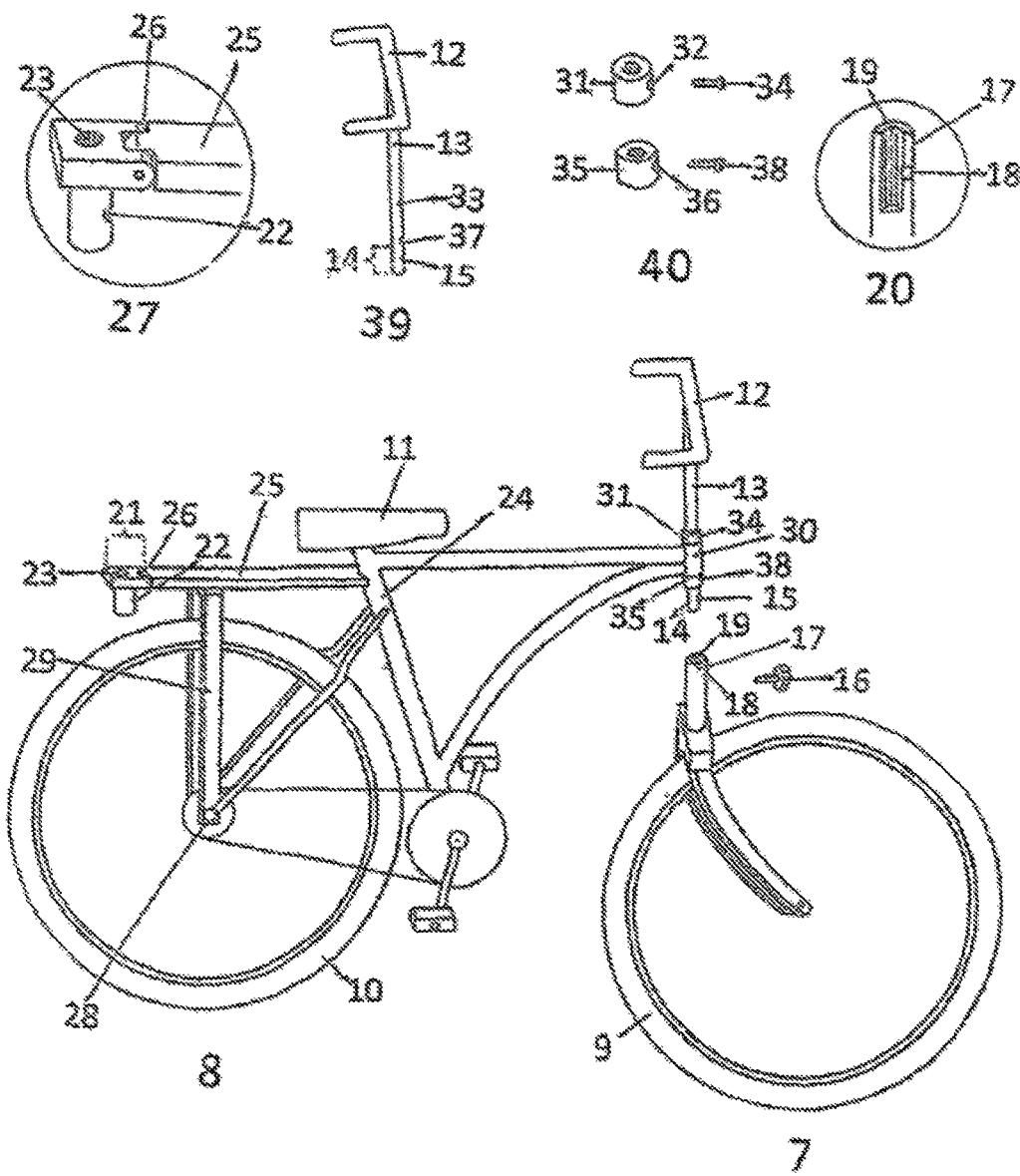
FIG. 2 illustrates an exploded view of a single unit of the convertible bicycle with components shown in greater detail.

FIG. 2 depicts an exploded view of the convertible bicycle of FIG. 1 and shows the interlocking parts in greater detail. Inset 20 shows the structure of the frontal female interlocking gear 17, which includes a screw hole 18 and a canal 19. Inset 40 shows that the upper connector ring 31 has a screw hole 32 and a corresponding upper screw 34; likewise, the lower connector ring 35 has a screw hole 36 and a corresponding lower screw 38. Inset 39 depicts the vertical handle rod 13 in more detail: the handlebars 12 are attached to the top of the vertical handle rod 13, and proceeding downwards the vertical handle rod 13 includes an upper rod hole 33, a lower rod hole 37, and a canal hole 15. A bottom end 14 of the vertical handle rod 13 is the portion which fits into the canal 19 of the frontal female interlocking gear 17. Inset 27 depicts the rear female interlocking gear 21, which includes a hinge 26 by which the rear female interlocking gear 21 is attached to the rear connecting beam 25, a canal 23, and a screw hole 22. If the bicycle is not to be operated in tandem, then the rear female interlocking gear 21 can be folded above the rear connecting beam 25 so that it does not hang down and interfere with operation of the rear wheel 10. Taken together, numeral 5 shows the components of the convertible bicycle. A front wheel unit 7 consists of the front wheel 9 and frontal female interlocking gear 17. A rear wheel unit 8 consists of the rear wheel 10, the rear wheel axle 28 and accompanying geartrain, the vertical supporting arch 29, the rear connecting beam 25, and the rear female interlocking gear 21.

FIG. 2 further illustrates how the bicycle components are connected together as a single unit without further units connected in tandem. The thumb screw 16 is inserted into the screw hole 18 of the frontal female interlocking gear 17 and the canal hole 15 of the vertical handle rod 13 when the bottom end 14 of the vertical handle rod 13 is disposed within the canal 19 of the frontal female interlocking gear 17. Once the thumb screw 16 is fastened securely, the handlebars 12 can be used by a bicyclist to steer the front wheel 9. The thumb screw 16 is also used to secure the vertical handle rod 13 to the canal 23 of the rear female interlocking gear 21, as described below.

The front vertical frame tube 30 is a hollow tube connected to the rear vertical supporting tube 24 by a triangular frame. The upper connector ring 31 is disposed on top of the front vertical frame tube 30, and the lower connector ring 35 is disposed below the front vertical frame tube 30. When the vertical handle rod 13 is inserted through the front vertical frame tube 30, the vertical handle rod 13 is locked in position by the upper screw 34 which passes through the upper connector ring screw hole 32 and the upper rod hole 33. Likewise, the lower screw 38 passes through the lower connector ring screw hole 36 and the lower rod hole 37. Ideally the screws 34 and 38 should not be tightened to the extent that the range of motion of the front wheel unit 7 is hampered, but they must be fastened firmly enough to keep the vertical handle rod 13 from slipping relative to the front vertical frame tube 30. If the theft of individual wheel units is a concern, the thumb screw 16 may be replaced with a screw that requires a tool to loosen.

Figure 3:
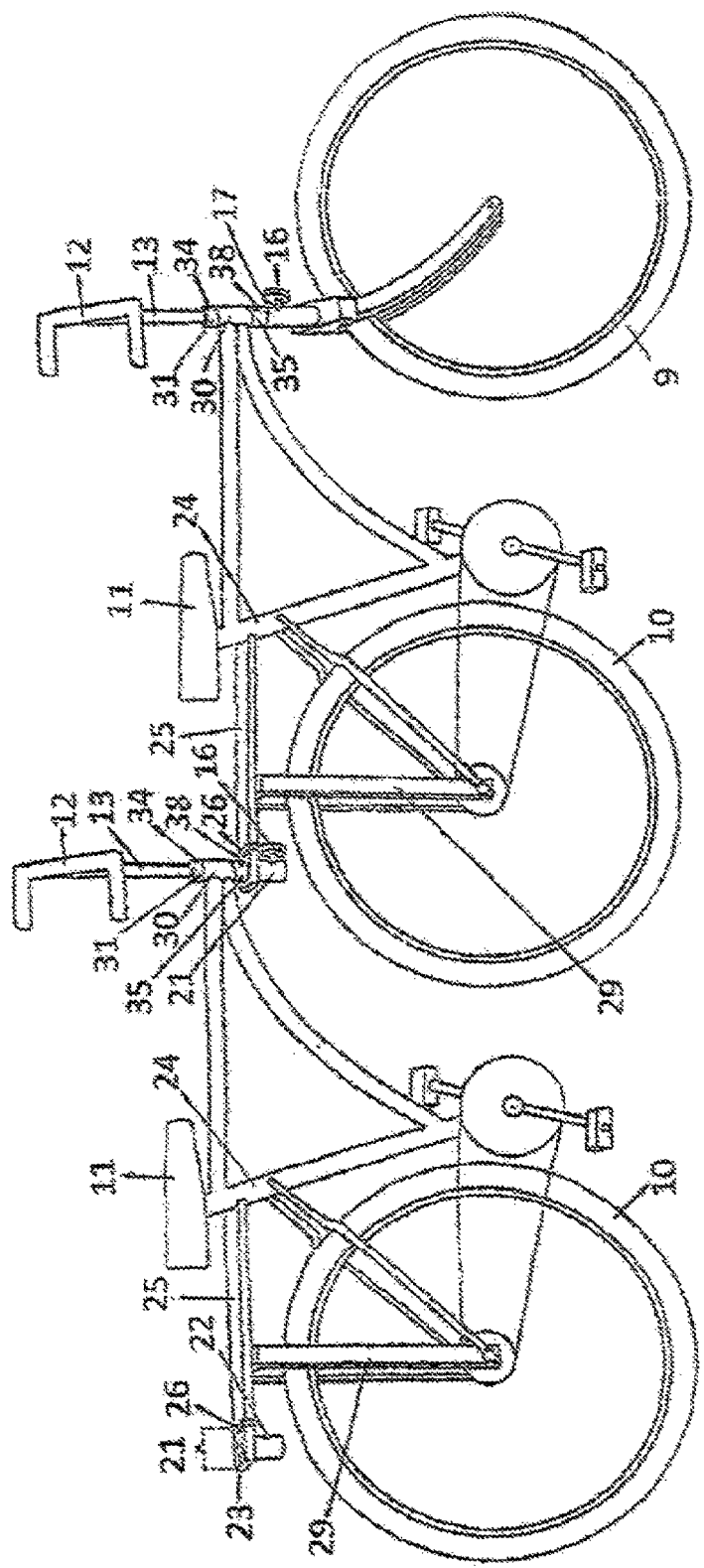
FIG. 3 illustrates the convertible bicycle in tandem operation.

FIG. 3 is an illustration of the convertible bicycle in tandem mode. The front wheel unit of the rear bicycle has been removed; the bottom end 14 of the vertical handle rod 13 now fits into the canal 23 of the rear female interlocking gear 21. Together they are secured by the thumb screw 16 being pushed into the screw hole 22 of the rear female interlocking gear 21 and the canal hole 15 of the vertical handle rod 13. This allows the rear bicycle to stay affixed to the rear connecting beam 25 of the forward bicycle. The rider of the rear bicycle may grip the handlebars 12 for stability without affecting the steering of the forward bicycle. Because of independent pedaling mechanism (gear train) attached to each triangular structure, each rider is also able to contribute towards the combined bicycle's motion by pedaling independently of the forward bicyclist's pedaling. Due to the way that the hinge 26 is attached to the rear connecting beam 25, the hinge 26 can flex upwards or downwards. This permits the rider of the rear bicycle unit to turn vertically relative to the rider of the forward unit, which may be an important consideration on rough or uneven terrain where there is a sharp change in gradient. The individual bicycle units can be easily detached from each other merely by removing the thumb screw 16 and lifting the vertical handle rod 13 out of the rear female interlocking gear 21. The presence of the vertical supporting arch 29 stabilizes the rear connecting beam 25, helping stabilize the front bicycle relative to the rear bicycle. While FIG. 3 depicts two bicycles operating in tandem, in theory there is no limit to the number of bicycle units which may be joined together in similar fashion.

Figure 4:
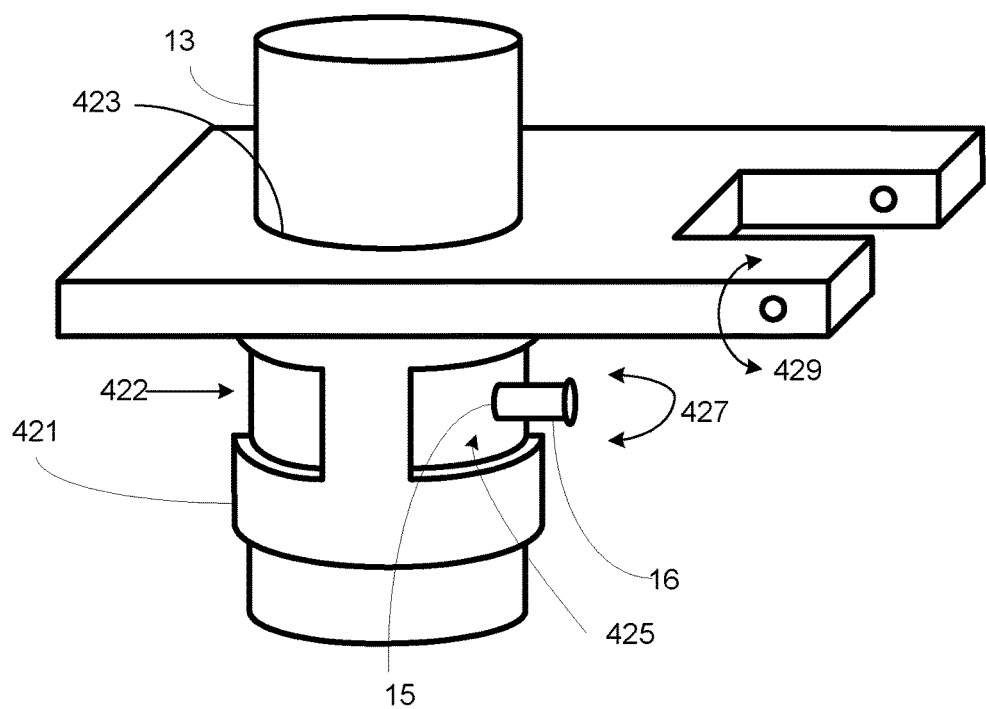
FIG. 4 illustrates an alternative embodiment of a tandem connecting device

FIG. 4 illustrates an alternative embodiment for a female interlocking gear 421. The female interlocking gear 421 includes a channel 423 that has a front window 425 and a rear window 422. The vertical handle rod 13 is inserted into the channel 423 and the channel hole 15 on the vertical handle rod 13 is exposed to the front window 425 and the thumb screw 16 is inserted into the canal hole 15 and exposed in the front window 425. The other end of the thumb screw 16 is exposed in the rear window 422. Because of the front window 425 and the rear window 422, the vertical handle rod 13 is permitted to rotate in both horizontal directions 427. The female interlocking gear 421 is connected to the connecting beam 25 through the hinge 26, thus permitting the female interlocking gear 421 to swing vertically 429 relative to the connecting beam 25.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, alternatives, and combinations of features shown in the above description are also possible. Accordingly, the claims are intended to cover all such equivalents which do not depart from the spirit of the invention.

What is claimed is:

1. A convertible bicycle, comprising:
    a front wheel unit, a rear wheel unit, a body frame, a plurality of pedals, a seat, a vertical handle rod, and handlebars, the front wheel unit being connected to the rear wheel unit via the body frame, the plurality of pedals and the seat being disposed on the body frame, and the vertical handle rod being disposed on the front wheel unit;
    the vertical handle rod having a top end, a bottom end, an upper rod hole, a lower rod hole, and a canal hole;
    a vertical frame tube, the vertical frame tube being cylindrical and having a top end, a bottom end, an outer wall, and an inner canal, the vertical frame tube being attached to the body frame by the outer wall, the vertical handle rod passes through the inner canal of the vertical frame tube;
    an upper connector ring with a screw hole, and a lower connector ring with a screw hole, the upper connector ring is disposed on the top end of the vertical frame tube and the lower connector ring is disposed on the bottom end of the vertical frame tube,
    wherein the front wheel unit comprises a front wheel and a frontal female interlocking gear; and
    the rear wheel unit comprises a rear wheel, a rear wheel axle, a gear train, and a rear female interlocking gear;
    with the front wheel unit removed, the vertical handle rod interfaces with the rear female interlocking gear of another bicycle to form a tandem tricycle, the handlebars are connected to the top end of the vertical handle rod and the frontal female interlocking gear is connected to the bottom end of the vertical handle rod.

2. The convertible bicycle of claim 1, wherein the body frame is triangular in shape and the seat is disposed on an upper vertex of the body frame.

3. The convertible bicycle of claim 1, further comprising:
a vertical supporting arch attached to the rear wheel axle, the vertical supporting arch having two supports and a level arch; and
a rear connecting beam with a front end and a back end attached to the level arch of the vertical supporting arch, the back end of the rear connecting beam being attached to the rear female interlocking gear of the rear wheel unit, the front end of the rear connecting beam being attached to the body frame.

4. The convertible bicycle of claim 3, further comprising:
the rear female interlocking gear having a canal and a hinge, wherein the canal further comprises a hollow cylindrical column and a screw hole, the hinge allowing the rear female interlocking gear to flex vertically relative to the rear connecting beam.

5. The convertible bicycle of claim 4, wherein the tandem bicycle is formed by removing the front wheel unit of the bicycle and inserting the vertical handle rod through the canal of the rear female interlocking gear of the other bicycle, the vertical handle rod being fastened into place by a thumb screw passing through the screw hole of the canal of the rear female interlocking gear and a canal hole of the vertical handle rod.

6. The convertible bicycle of claim 1, wherein the vertical handle rod passes through the upper connector ring and the lower connector ring, and is fastened in place by a plurality of screws, one screw passing through the upper rod hole of the vertical handle rod and the screw hole of the upper connector ring, and another screw passing through the lower rod hole of the vertical handle rod and the screw hole of the lower connector ring.

7. The convertible bicycle of claim 1, wherein the frontal female interlocking gear comprises a screw hole and a canal, and the vertical handle rod is attached to the frontal female interlocking gear by a thumb screw inserted through the canal and the canal hole.

8. The convertible bicycle of claim 1, wherein the tandem tricycle has two independent gear trains.

\* \* \* \* \*